US009567091B2

United States Patent
Schaeffer et al.

(10) Patent No.: US 9,567,091 B2
(45) Date of Patent: Feb. 14, 2017

(54) SYSTEM AND METHOD FOR MAXIMIZING AIRCRAFT SAFE LANDING CAPABILITY DURING ONE ENGINE INOPERATIVE OPERATION

(71) Applicant: Bell Helicopter Textron Inc., Fort Worth, TX (US)

(72) Inventors: Joseph M. Schaeffer, Cedar Hill, TX (US); Jignesh Patel, Trophy Club, TX (US); Eric O'Neill, Great Mills, MD (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 108 days.

(21) Appl. No.: 14/297,159

(22) Filed: Jun. 5, 2014

(65) Prior Publication Data

US 2014/0365039 A1 Dec. 11, 2014

Related U.S. Application Data

(60) Provisional application No. 61/831,969, filed on Jun. 6, 2013.

(51) Int. Cl.
| | |
|---|---|
| *B64D 31/00* | (2006.01) |
| *B64C 19/00* | (2006.01) |
| *G05D 1/00* | (2006.01) |
| *B64C 27/54* | (2006.01) |
| *B64C 27/57* | (2006.01) |

(52) U.S. Cl.
CPC ............... *B64D 31/00* (2013.01); *B64C 19/00* (2013.01); *B64C 27/54* (2013.01); *G05D 1/0072* (2013.01); *B64C 27/57* (2013.01)

(58) Field of Classification Search
CPC ....... G01C 23/005; B64D 31/00; B64C 19/00; G05D 1/0072
See application file for complete search history.

(56) References Cited

U.S. PATENT DOCUMENTS

| | | |
|---|---|---|
| 2004/0010354 A1 | 1/2004 | Nicholas et al. |
| 2008/0161983 A1 | 7/2008 | Salesse-Lavergne |
| 2009/0186320 A1 | 7/2009 | Rucci et al. |
| 2010/0235019 A1* | 9/2010 | De Bono et al. ............... 701/14 |
| 2013/0204468 A1* | 8/2013 | Camhi .................... G06F 17/00 701/3 |

FOREIGN PATENT DOCUMENTS

WO 0189926 A2 11/2001

OTHER PUBLICATIONS

European Search Report in related European Application No. 14171614.2, dated Oct. 27, 2014, 3 pages.
Communication in related European Application No. 14171614.2, dated Nov. 13, 2014, 6 pages.

* cited by examiner

*Primary Examiner* — Basil T Jos

(57) ABSTRACT

A method of preserving rotor speed during a one engine inoperative operation of an rotorcraft, the method can include: detecting a failure of a first engine; monitoring an engine parameter associated with a second engine; using a computer processor to compare the engine parameter to an engine limit; and commanding a decrease collective pitch command when the engine parameter is within a predefined range of the engine limit.

19 Claims, 4 Drawing Sheets

SYSTEM AND METHOD FOR MAXIMIZING AIRCRAFT SAFE LANDING CAPABILITY DURING ONE ENGINE INOPERATIVE OPERATION

BACKGROUND

Technical Field

The present disclosure relates to a system and method of governing rotor speed on a rotorcraft. More particularly, the system and method relate to a rotorcraft rotor speed governing during single engine inoperative event.

Description of Related Art

Conventionally, certain rotorcraft have employed some level of rotor speed control in a fly by wire flight control system. For example, rotor speed can be controlled by an engine control unit. However, controlling rotor speed with the engine control unit has shortcomings in certain situations.

There is a need for an improved flight control system.

DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 1:
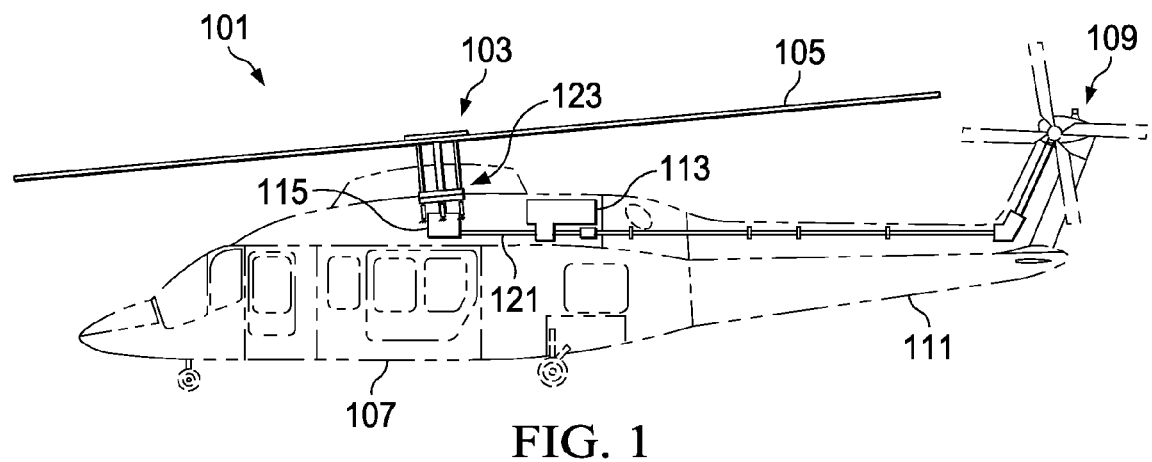
FIG. 1 is a side view of an rotorcraft, according to one example embodiment.

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The method and system of the present disclosure relate to rotor speed governing on helicopters. In particular, the method and system of the present disclosure relate to helicopter rotor speed governing during single engine operation when near an engine or transmission limit. More specifically, the method and system of the present disclosure maximize the safe landing capability during one engine inoperative (OEI) operation on a multi-engine rotorcraft.

Alternative methods of maximizing safe landing capability during one engine inoperative (OEI) operation have significant shortcomings. For example, one alternative method is utilizing a high inertia rotor so that rotor speed will not decrease as quickly after an engine failure as a low inertia rotor would; however, disadvantages include the additional weight associated with a high inertia rotor, as well as the loss in thrust from the decrease in rotor speed. Another alternative method relies on the pilot to monitor rotor speed after an engine failure and adjust collective pitch accordingly; however, increasing pilot workload in an emergency situation is undesirable and a pilot can rarely react quickly enough. Another alternative method utilizes full time rotor speed governing with collective throttle command; however, this requires the pilot to add power in response to the one engine failure while the governor maintains rotor speed, which would result in degraded response to the engine failure. Another alternative method utilizes full time rotor speed governing with collective, combined with engine governing (total torque) to maintain power; however, one disadvantage is that collective pitch is reduced immediately upon loss of power, resulting in a more severe transient loss of lift while the remaining engine increases power. In contrast to this method, the system and method of the present disclosure does not decrease collective until the engine has already reached its maximum power and is unable to provide any more power to control rotor speed.

Referring now to FIG. 1 in the drawings, a rotorcraft 101 is illustrated. Rotorcraft 101 can include a rotor system 103 with a plurality of rotor blades 105. The pitch of each rotor blade 105 can be managed in order to selectively control direction, thrust, and lift of rotorcraft 101. For example, a swashplate mechanism 123 can be used to collectively and/or cyclically change the pitch of rotor blades 105. It should be appreciated that swashplate mechanism 123 is merely exemplary of one possible system for selectively controlling the pitch of rotor blades 105; for example, an independent blade control system is another exemplary system for selectively controlling the pitch of rotor blades 105. Rotorcraft 101 can include an airframe 107, anti-torque system 109, and an empennage 111. Torque can be supplied to rotor system 103 and anti-torque system 109 with at least one engine 113. A main rotor gearbox 115 is operably associated with an engine main output driveshaft 121 and the main rotor mast.

Rotorcraft 101 is merely illustrative of the wide variety of aircraft and vehicles that are particularly well suited to take advantage of the method and system of the present disclosure. It should be appreciated that other aircraft can also utilize the method and system of the present disclosure.

A rotorcraft with a low inertia rotor system may especially benefit from the system and method of the present disclosure.

Figure 2:
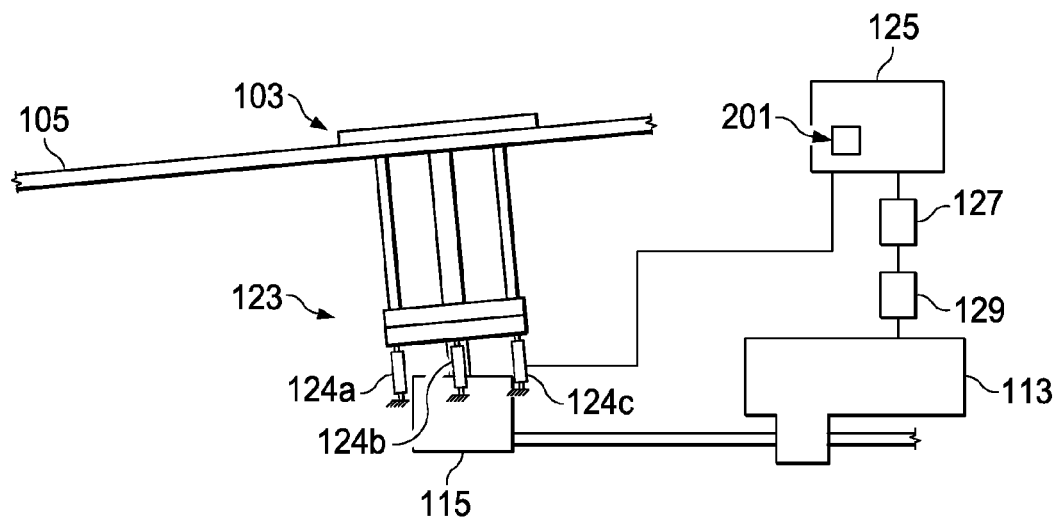
FIG. 2 is a partially schematic view of rotorcraft systems, according to one example embodiment.

Referring now also to FIG. 2 in the drawings, a system 201 is illustrated in conjunction with rotorcraft 101. It should be appreciated that though system 201 is illustrated with regard to rotorcraft 101, system 201 is also implementable on other aircraft as well. Further, it should be appreciated that system 201 can be implemented in a wide variety of configurations, depending in part on the flight control configuration of the aircraft.

System 201 is particularly well suited for implementation in aircraft having a fly-by-wire flight control computer, such as flight control computer 125; however, a partial fly-by-wire aircraft can also utilize system 201. For example, system 201 can be utilized with a flight control system having collective actuators 124a, 124b, and 124c that can receive commands from a trim motor, autopilot system, or any other system that allows collective commands to be realized by collective actuators 124a, 124b, and 124c. Further, system 201 is particularly well suited for implementation with aircraft having an engine controlled by an engine control unit 127, such as a FADEC (full authority digital engine control) system. However, system 201 can also be implemented on an aircraft having an engine that is not controlled by an engine control unit 127, in such an embodiment, system 201 can make fuel control commands directly to a fuel control unit 129, for example.

Figure 3:
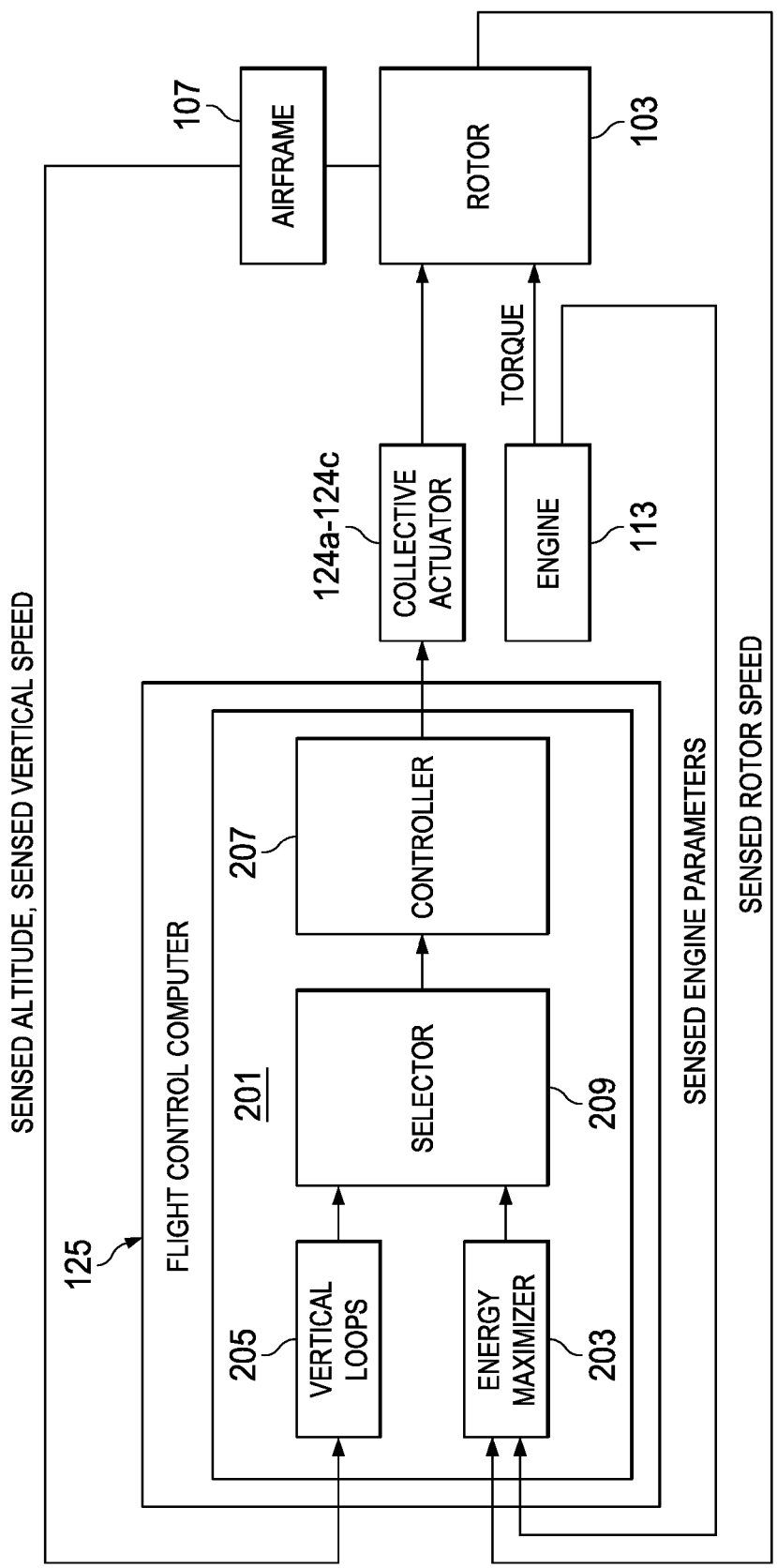
FIG. 3 is a schematic view of a system, according to one example embodiment.

Referring now also to FIG. 3, a schematic view of system 201 is schematically illustrated in conjunction with features of rotorcraft 101. System 201 is configured as an interface between engine 113, airframe 107, flight control computer 125, and collective actuators 124a-124c. The flight control computer 125 uses data from the engine 113 and rotor system 103 to calculate a collective pitch command, sent to the collective actuators 124a-124c, which will maximize power during an OEI event while on a torque limit, and energy while on other engine limits.

Any number and variety of sensors can be utilized to provide certain data to flight control computer 125 and system 201. System 201 is preferably integrated with flight control computer 125; however, in another embodiment system 201 can be a standalone computer system within the aircraft. As discussed further herein, flight control computer 125 and system 201 can include computer related equipment, such as processors and the like for performing associated functions.

Still referring to FIG. 3, system 201 can include control laws, which are illustrated as vertical loops 205. Vertical loops 205 can include vertical axis control laws configured to make control commands so that the rotorcraft can hold a desired vertical axis state, such as vertical speed or vertical altitude, for example. In one implementation, the vertical loops 205 can adjust for differences between a commanded vertical state and an actual vertical state. In one example, the rotorcraft is directed to hold the rotorcraft a commanded altitude, but the rotorcraft experiences a sudden updraft of wind, then the vertical loops 205 can in response generate commands to collective actuators 124a-124c in order to decrease pitch and thrust in order to maintain the commanded altitude.

System 201 can also include a controller 207 configured to adjust a received command to minimize an error signal and then send output adjusted command to collective actuators 124a-124c. In one embodiment, controller 207 includes a proportional plus integral (P+I) functionality; however, it should be appreciated that controller 207 may include any implementation specific desired functionality.

One unique feature of system 201 is the inclusion of an energy maximizer command 203. During normal operation, rotor speed is typically controlled by the engine; however, system 201 is configured such that energy maximizer command 203 acts to reduce collective pitch to maintain rotor speed only when engine 113 is at or near an operating limit. As a result, a potential force-fight between the engine controller and a collective governor is avoided. Further, lift on the rotor system 103 is preserved until the engine has reached its operating limit. Example engine operating limits can include engine torque, measured gas temperature (MGT) and gas generator speed (Ng). In one embodiment, a transmission torque limit is an engine limit.

Figure 4:
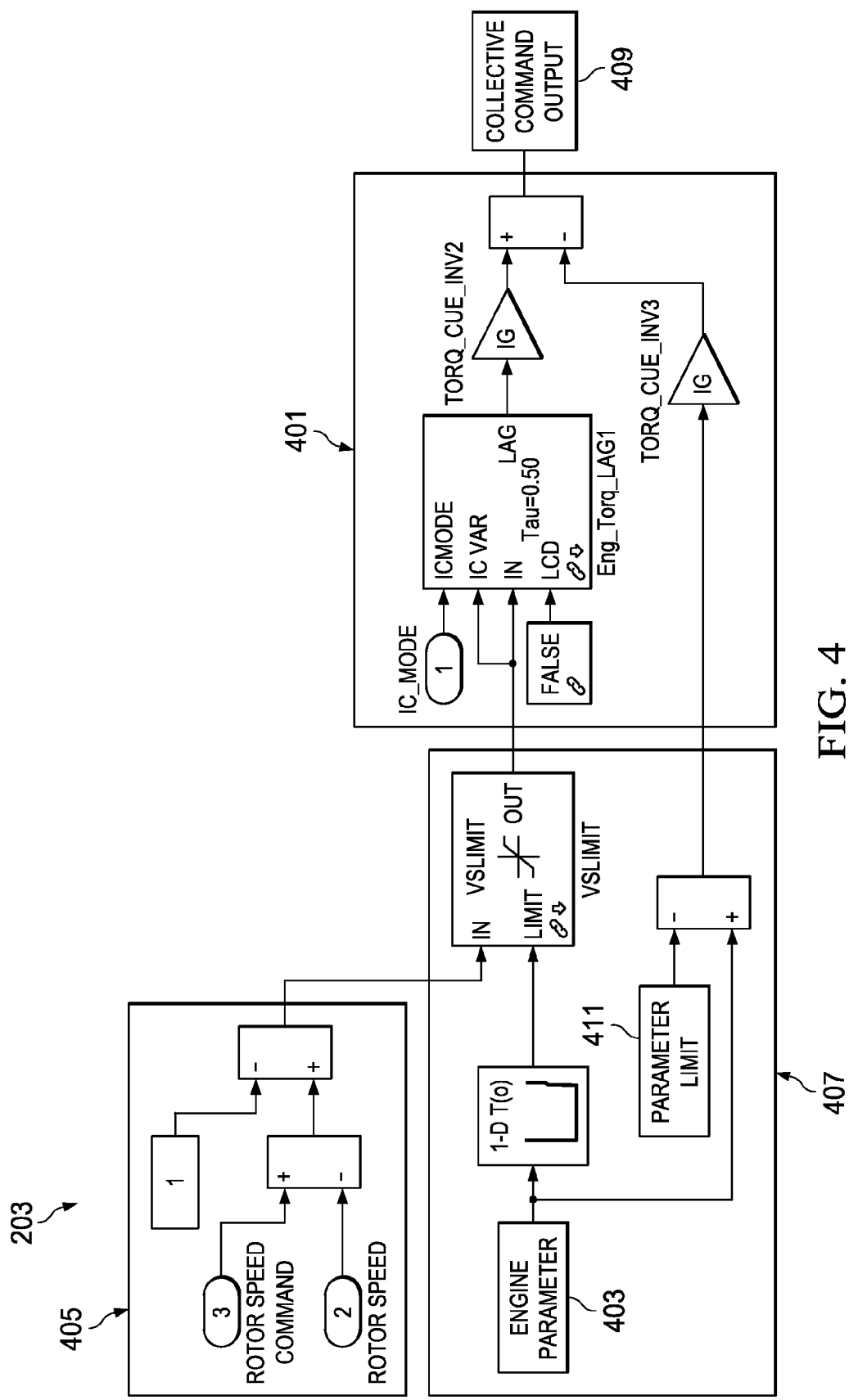
FIG. 4 is a schematic view of a energy maximizer command, according to one example embodiment.

Referring now also to FIG. 4, calculation of the energy maximizer command 203 is described in further detail. FIG. 4 illustrates torque as the engine parameter 403 by way of example; however, the same concept can be utilized on measured gas temperature and gas generator speed, for example. Algorithm unit 405 calculates a maximum rotor speed error as a function of torque. When actual rotor speed drops below rotor speed command by a specific amount (1% for example), a function of the rotor speed error is added to the difference between the torque and the torque limit. Algorithm unit 407 calculates a collective command when engine parameter 403 (in this case engine torque) is at or near a parameter limit 411. Algorithm unit 407 is configured such that if the engine is at or near a limit, the rotor speed error will come through so that energy maximizer command 203 will make a command output 409. As a result, the rotor speed error will have an impact since the addition of the two outputs of algorithm unit 407 will increase as torque approaches the limit. It should be noted that a rotor speed droop will only occur if the remaining engine(s) does not have enough power to maintain rotor speed. The command output 409 is used as an input to controller 207. In order to prevent the command output 409 from causing an undesired integrator offset, a limiting or "selection scheme" can be applied. One example of a selection scheme can be applied by using a selector 209 to select the lower of the decrease collective commands from energy maximizer 203 and vertical loops 205. Alternate schemes can be to place a specific limit (e.g. upper limit at 0) on the integrator and P+I paths, or define hold logic on the integrator. Energy maximizer command 203 functions to only decrease collective in order to control rotor speed once the remaining engine has already reached its maximum power (or near maximum power) and is unable to provide any more power (or nearly any more power).

The method and system can be implemented by commanding the collective stick via trim motor, rather than directly commanding the collective actuator. Directly commanding the swashplate has the slight advantage in that a higher bandwidth can be obtained, if desired.

The method and system allows an aircraft to land safely after an engine failure without pilot action, even the aircraft is heavily loaded.

One unique feature is that the method and system successfully transition between throttle governing and collective governing to control rotor speed. Further, the method and system allow collective governing only under the specified circumstances where the engine cannot provide enough power to control rotor speed.

Figure 5:
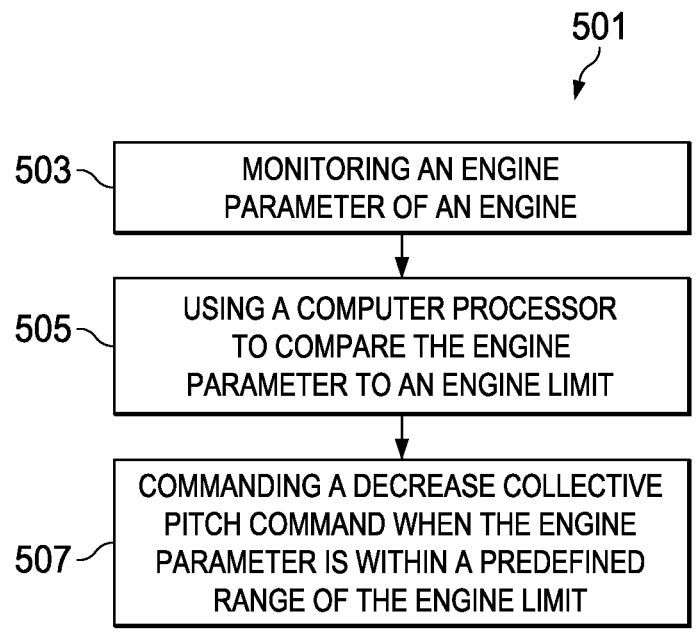
FIG. 5 is a schematic view of a method, according to one example embodiment.

Referring now also to FIG. 5, a method 501 of preserving rotor speed during a one engine inoperative operation of an rotorcraft can include a step 503 of monitoring an engine parameter of an engine; a step 505 of using a computer processor to compare the engine parameter to an engine limit; and a step 507 of commanding a decrease collective pitch command when the engine parameter is within a predefined range of the engine limit.

Figure 6:
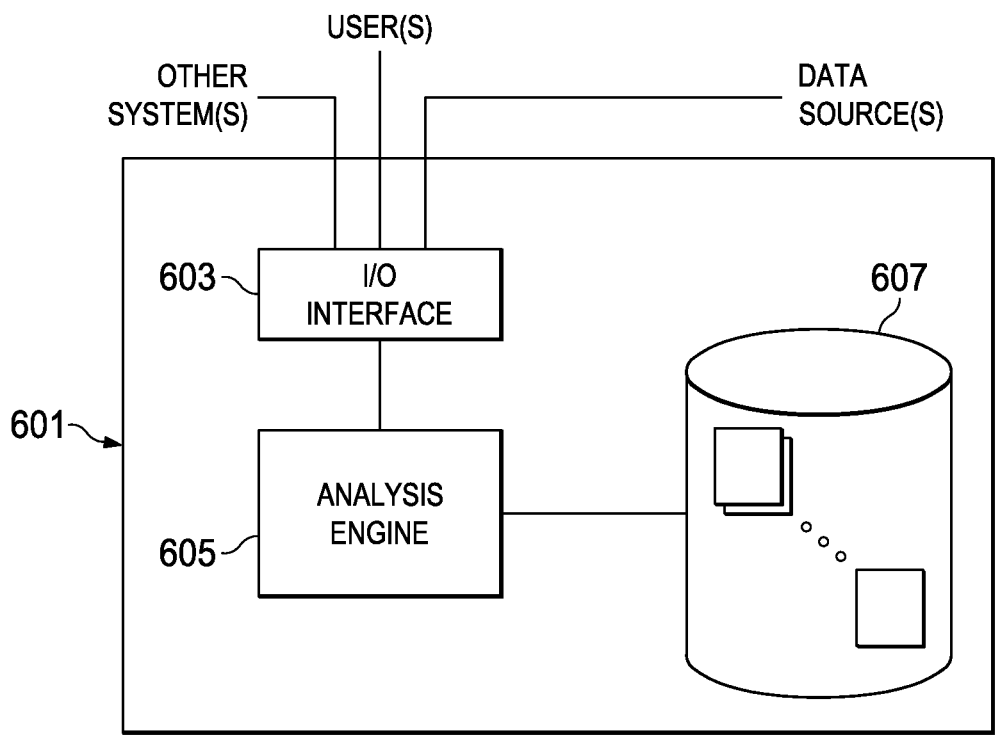
FIG. 6 is a schematic view of a computer system, according to one example embodiment.

Referring now also to FIG. 6, a computer system 601 is schematically illustrated. Computer system 601 can be configured for performing one or more functions with regard to the operation of system and method further disclosed herein. Further, any processing and analysis can be partly or fully performed by computer system 601. Computer system 601 can be partly or fully integrated with other aircraft computer systems.

The system 601 can include an input/output (I/O) interface 603, an analysis engine 605, and a database 607. Alternative embodiments can combine or distribute the input/output (I/O) interface 603, analysis engine 605, and database 607, as desired. Embodiments of the system 601 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 603 can provide a communication link between external users, systems, and data sources and components of the system 601. The I/O interface 603 can be configured for allowing one or more users to input information to the system 601 via any known input device. Examples can include a keyboard, mouse, touch screen, and/or any other desired input device. The I/O interface 603 can be configured for allowing one or more users to receive information output from the system 601 via any known output device. Examples can include a display monitor, a printer, cockpit display, and/or any other desired output device. The I/O interface 603 can be configured for allowing other systems to communicate with the system 601. For example, the I/O interface 603 can allow one or more remote computer(s) to access information, input information, and/or remotely instruct the system 601 to perform one or more of the tasks described herein. The I/O interface 603 can be configured for allowing communication with one or more remote data sources. For example, the I/O interface 603 can allow one or more remote data source(s) to access information, input information, and/or remotely instruct the system 601 to perform one or more of the tasks described herein.

The database 607 provides persistent data storage for system 601. While the term "database" is primarily used, a memory or other suitable data storage arrangement may provide the functionality of the database 607. In alternative embodiments, the database 607 can be integral to or separate from the system 601 and can operate on one or more computers. The database 607 preferably provides non-volatile data storage for any information suitable to support the operation of system 201 and method 501, including various types of data discussed further herein. The analysis engine 605 can include various combinations of one or more processors, memories, and software components.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the disclosure. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A method of preserving a rotor speed of a rotor system during a one engine inoperative operation of a rotorcraft, the method comprising:
monitoring an engine parameter of an engine;
comparing, using a computer processor, the engine parameter to an engine limit, the engine limit being an upper operating limit of the engine;
governing the rotor speed of the rotor system by controlling a power of the engine;
ceasing the governing of the rotor speed of the rotor system by controlling the power of the engine, when the engine parameter reaches the engine limit, and
automatically commanding a decrease collective pitch command with a computer controller in response to the engine parameter reaching the engine limit, such that a pitch of a plurality of rotor blades in the rotor system is decreased so as to preserve the rotor speed of the rotor system.

2. The method according to claim 1, wherein the engine parameter is an engine torque of the engine.

3. The method according to claim 1, wherein the engine parameter is a measured gas temperature of the engine.

4. The method according to claim 1, wherein the engine parameter is a gas generator speed (Ng) of the engine.

5. The method according to claim 1, wherein the engine parameter is a transmission torque.

6. The method according to claim 1, wherein step of automatically commanding the decrease collective pitch command occurs after a decrease in the rotor speed below a commanded rotor speed.

7. The method according to claim 1, wherein step of automatically commanding the decrease collective pitch command causes the rotor speed to increase.

8. A method of preserving a rotor speed of a rotor system during a one engine inoperative operation of a rotorcraft, the method comprising:

detecting a failure of a first engine;
monitoring an engine parameter associated with a second engine;
using a computer processor to compare the engine parameter to an engine limit, the engine limit being an upper operating limit of the second engine;
governing the rotor speed of the rotor system by controlling a power of the second engine;
ceasing the governing of the rotor speed of the rotor system by controlling the power of the second engine, when the engine parameter reaches the engine limit, and
commanding a decrease collective pitch command with a computer controller in response to the engine parameter reaching a predefined range of the engine limit, such that a pitch of a plurality of rotor blades in the rotor system is decreased so as to preserve the rotor speed of the rotor system.

9. The method according to claim 8, wherein the engine parameter is an engine torque of the second engine.

10. The method according to claim 8, wherein the engine parameter is a measured gas temperature of the second engine.

11. The method according to claim 8, wherein the engine parameter is an engine gas generator speed of the second engine.

12. The method according to claim 8, wherein the engine parameter is a transmission torque of a transmission.

13. The method according to claim 8, wherein step of commanding the decrease collective pitch command occurs after a decrease in the rotor speed below a commanded rotor speed.

14. A system for preserving a rotor speed of a rotor system during a one engine inoperative operation of a rotorcraft, the system comprising:
an engine;
a computer having a control law, the control law operable to monitor an engine parameter associated with the engine and compare the engine parameter to an engine limit, the control law further operable to govern the rotor speed of the rotor system by controlling a power of the engine, but then ceasing the governing of the rotor speed of the rotor system with the power of the engine when the engine parameter reaches the engine limit, and the computer further operable to command a decrease collective pitch command in response to the engine parameter reaching the engine limit, such that a pitch of a plurality of rotor blades in the rotor system is decreased so as to preserve the rotor speed of the rotor system.

15. The system according to claim 14, further comprising:
a collective actuator in communication with the computer, the collective actuator configured to change the pitch of the plurality of rotor blades in the rotor system upon actuation of the collective actuator.

16. The system according to claim 14, further comprising:
a sensor for measuring an engine torque of the engine;
wherein the engine parameter is the engine torque.

17. The system according to claim 14, further comprising:
a sensor for measuring a gas temperature of the engine;
wherein the engine parameter is the gas temperature.

18. The system according to claim 14, further comprising:
a sensor for measuring a gas generator speed of the engine;
wherein the engine parameter is the gas generator speed.

19. The system according to claim 14, wherein the command to decrease collective pitch command occurs in response to a decrease in the rotor speed below a commanded rotor speed.

* * * * *